United States Patent Office 3,730,846
Patented May 1, 1973

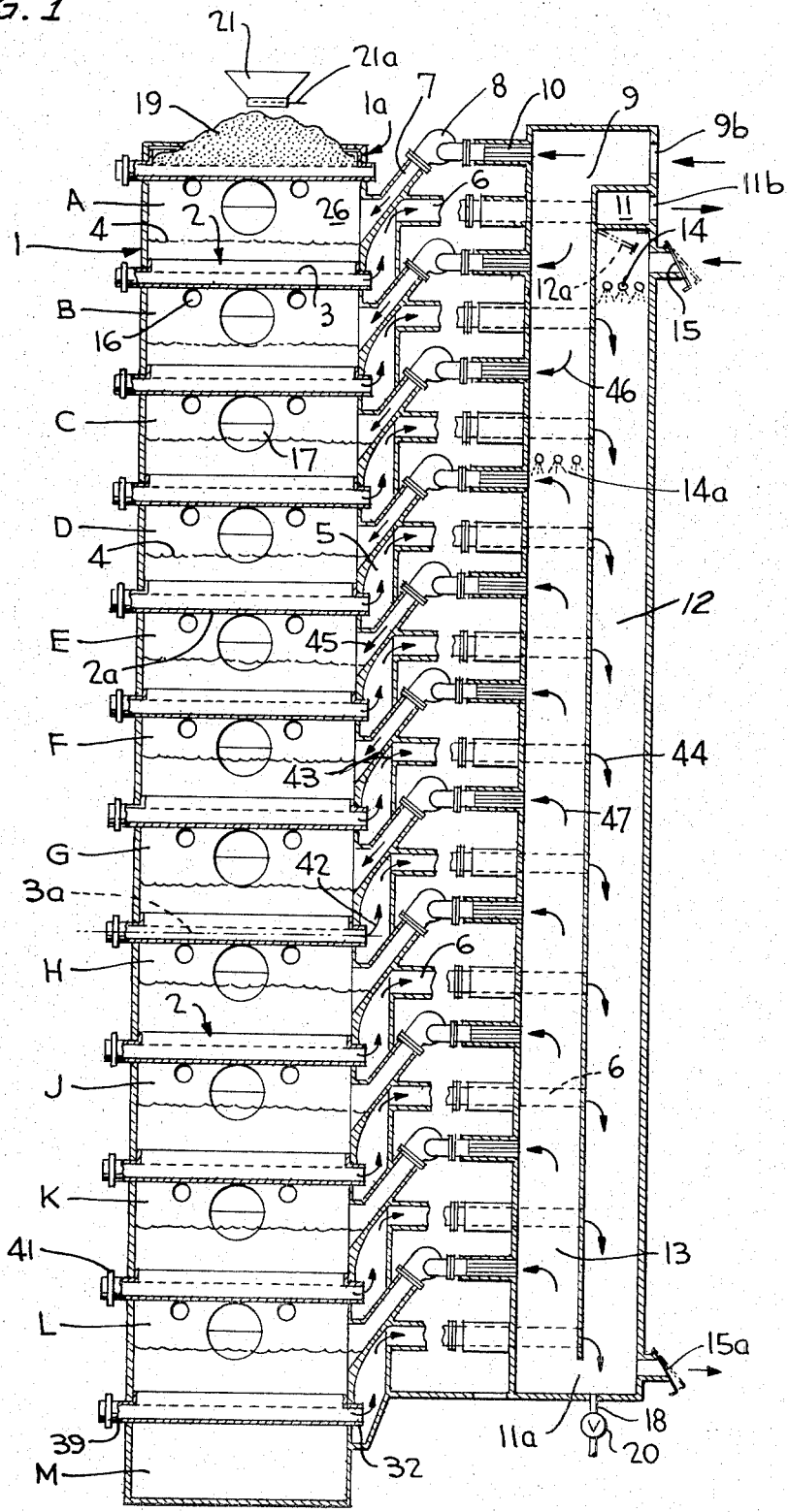

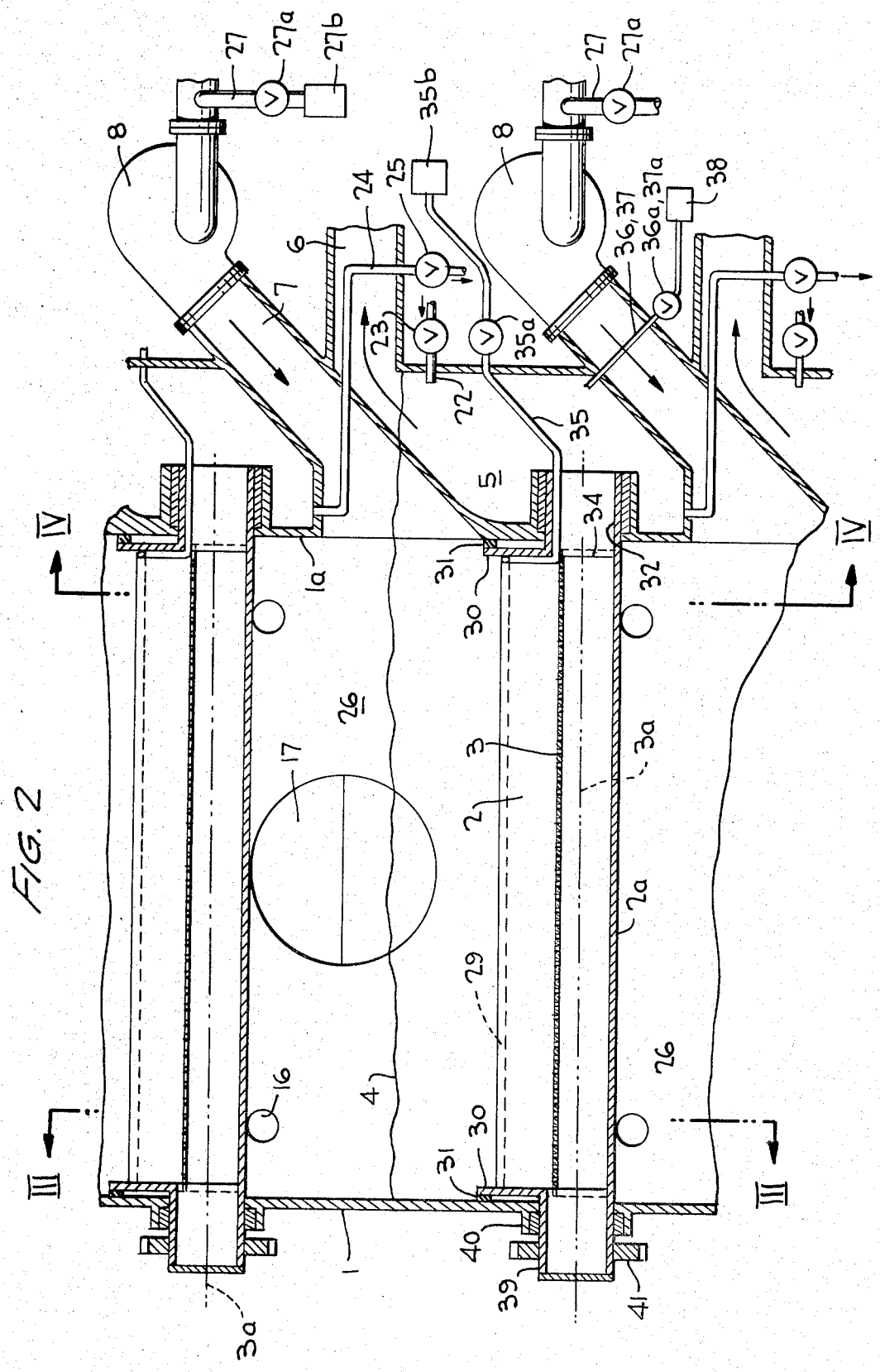

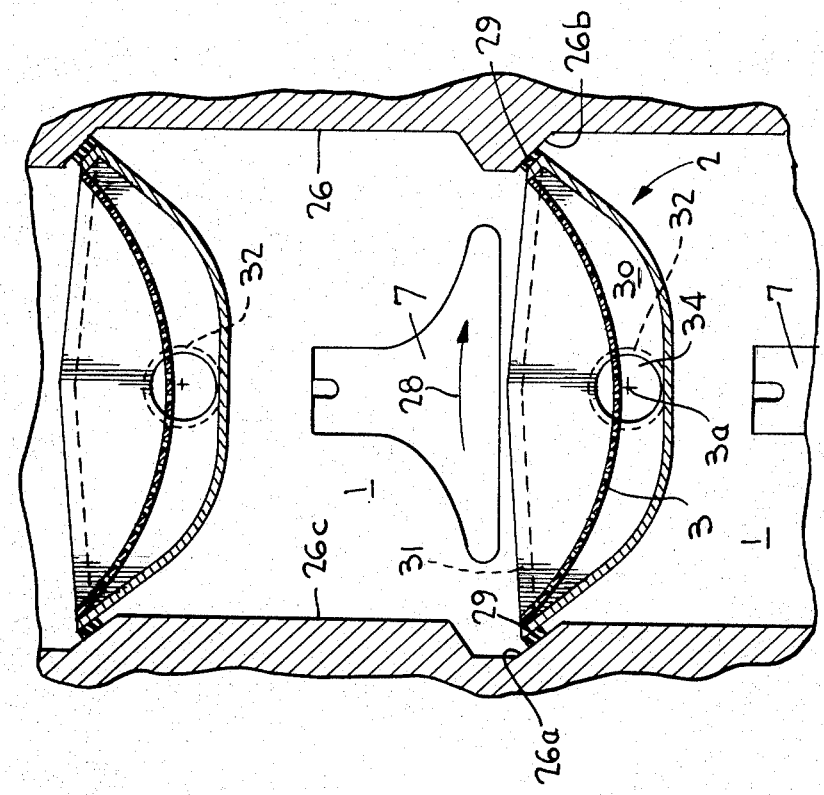
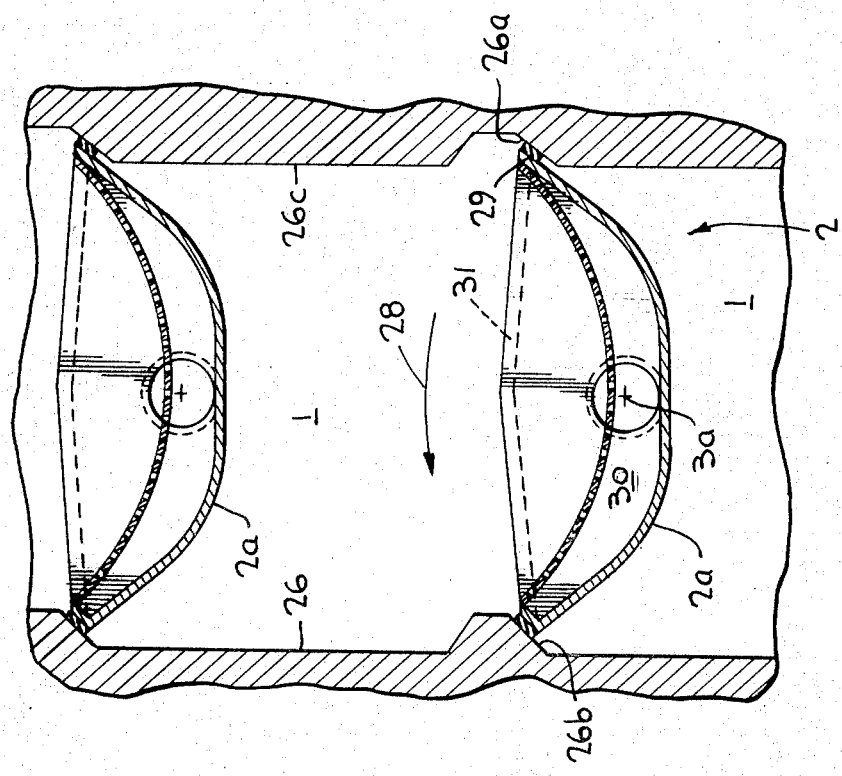

3,730,846
APPARATUS FOR MALTING GRAIN
Gerhart Neubert, Duisberg-Beeck, Germany, assignor to Rheinstahl Wanheim G.m.b.H., Duisburg-Wanheim, Germany
Application Sept. 30, 1969, Ser. No. 862,384, which is a continuation-in-part of application Ser. No. 595,527, Nov. 18, 1966, both abandoned. Divided and this application Aug. 21, 1970, Ser. No. 66,057
Int. Cl. A23l 1/00; C12c 1/00
U.S. Cl. 195—129     5 Claims

ABSTRACT OF THE DISCLOSURE

Production of malt utilizing a vertical malting tower having a plurality of normally horizontal troughs with perforated strainers to support a quantity of grain, the troughs including imperforate bottoms and peripheral sealing means to define separate treatment spaces in vertical array, with means for individually tilting each trough about a horizontal axis to drop the grain to successive treatment spaces. The preferred process comprises steeping the grain to about 38 percent water content, partially germinating the steeped grain, resteeping the partially germinated grain, aerating the grain, and repeating the resteeping and aerating at least once to produce a steeped grain with a water content of at least about 48 percent, and allowing such grain to germinate further.

---

This application is a divisional application of copending application Ser. No. 862,384, now abandoned, filed Sept. 30, 1969, which in turn is a continuation-in-part of application Ser. No. 595,527, filed Nov. 18, 1966, and now abandoned.

The instant invention relates to apparatus for the production of malt by malting grain and relates more particularly to an improved malting tower having a plurality of vertically spaced, individually pivotable, troughs dividing the tower into a plurality of sealed treatment spaces in vertical array, the troughs being tippable to feed the material being processed to a lower treatment space, and to a preferred procedure for using such a tower in which the malting material is repeatedly softened in water for relatively short periods in the treatment spaces, with the water being withdrawn after each softening and the malting material being allowed to germinate further in the presence of a constant flow of an oxygen-containing gas or gas mixture.

In one known process for malting grain, known as the "resteeping" process, the malting material is softened by steeping in water, to a water content as high as about 40% and occasionally about 42%, and germinates, whereupon the inner seedling (plumule) and the outer seedling (radical) grow. The partially germinated grain is then softened further and germinates in a single stage, thereby acquiring a water content of about 47% or even more. The second softening produces a malting material, the grain of which has the full water complement required for malting but which has, however, an undesirable appearance. It has been determined that the growth of the plumule, undesirably, gradually becomes weak, while advantageously, the radical does not grow. If the second softening is extended for so long that the desired high water content of the grain is attained, the malting material frequently becomes malodorous and acquires an undesired taste.

While the tower of the instant invention may be used with various malting processes, a preferred process for utilizing such tower utilizes a steeping phase, in which the malting material is steeped in water and ventilated until it has acquired a water content of approximately 38% by weight of the grain used (rice, barley or the like); allowing the steeped grain to partially germinate; resteeping the partially germinated grain in water; thereafter aerating the grain produced with an oxygen-containing gas such as air, including air in which a portion of the oxygen content has been replaced with carbon dioxide; and repeating the resteeping and aeration at least once, thereby producing a steeped grain having a water content of at least about 48 percent; and allowing such grain to germinate. The second phase thus involves not merely a germinating, but also a further steeping process and is therefore referred to as a steeping and germinating process.

In a conventional malting tower of the type described, for example in U.S. Pat. No. 1,961,990, grid-like racks are provided which constitute a partition between individual treatment chambers in the tower and allow passage of both air and liquid. Although an impermeable tray is located below the rocks to catch water dropping from the racks, it is impossible to steep the malting material in standing water. Aeration of the malting material is effected from below, through the racks, i.e. from a lower treatment chamber to an upper one, so that the malting tower is necessarily of a substantial height, since the malting material may be contained only in every second chamber. Furthermore, only a single riser is provided so that air of like physical and chemical characteristics is conveyed to each treatment chamber.

It is a primary object of the present invention to provide a malting apparatus free of the above disadvantages.

It is a further object of the invention to provide a process for malting grain utilizing the inventive apparatus which eliminates or reduces the tendency of the malting material to become malodorous or "stink."

It is still a further object of the invention to provide a vertical malting tower having a plurality of treatment spaces disposed in vertical array, the malting material being transported through said treatment spaces by causing to fall from one treatment space to the space directly below it.

Yet another object of this invention is the provision of a malting tower in which the individual treatment spaces may be sealed from each other and subjected to different processing conditions.

A still further object of the instant invention is the provision of an apparatus which is simple and inexpensive, but reliable and durable in operation, and which enables a malting technique which is highly expeditious and provides an improved product.

Other objects and advantages of the invention will become apparent as the description proceeds.

In one embodiment of the process for utilizing the inventive apparatus, the malting material, before it is steeped in water for the last time, has already been allowed to absorb, during the preceding steeping and resteeping steps, a water content of about 48 weight percent. Further, it is preferable that the process be carried out in such a way that the malting material, when it has acquired said water content of at least about 48 weight percent, is not subjected to further resteeping but is thereafter treated with a gas or a gas mixture poor in oxygen, such as carbon dioxide.

The various steeping, resteeping, germinating, aeration etc. steps may be effected in a plurality of independent treatment spaces which are arranged one above the other utilizing the malting tower of this invention, the malting material then being transported through the treatment spaces by causing it to fall from an upper treatment space into a treatment space located thereunder.

The preferred apparatus hereof comprises a vertical malting tower containing a plurality of normal horizontal troughs to hold grain, said troughs being tiltable about horizontal axes and defining the aforementioned plurality of treatment spaces in said tower, such that when said troughs are horizontal said treatment spaces are sealed off from one another and when said troughs tilt said grain may fall from each trough to a trough below; means for charging and discharging fluid into and from said treatment spaces; and means for supplying grain to the uppermost trough and for removing grain from the bottom trough. In order to most effectively and economically utilize the malting tower, each treatment space should be independently feedable with fluids (gas, water etc.) and the heating/cooling of each space should be independently controllable.

Such a malting tower enables each load to be treated in accordance with the characteristics of the type of barley used, e.g. to determine individually the lengths of the various germination stages. Further, as the grains fall from one trough to another, each individual grain is brought into contact with the atmosphere and the grains which were at the top of the pile of grain in the upper trough will be generally at or towards the bottom of the pile of grain in the lower trough. These two factors enable a far more homogeneous product to be obtained than can generally be obtained by known processes such as "box malting."

The preferred process for utilizing the present invention is based on the fact that steeping in water not only supplies water to the grain but also substantially restricts the access of oxygen to the grain. The failure of the outer seedling to grow during the second steeping in the prior art process is attributable to the oxygen deficiency caused by the water, whereas the inner seedling has available to it a certain supply of oxygen from the grain itself. If this oxygen supply from the grain is exhausted, the inner seedling also stops growing. The residual oxygen present in spite of, or because of, the water suffices only to chemically decompose the grain thus causing it to exude malodorous gases. In the instant process, the steeping in the second phase is periodically interrupted by aeration with an oxygen-containing gas, e.g. air, or even air in which part of the oxygen has been replaced by carbon dioxide. This means that oxygen is periodically supplied to the grain, this supply being interrupted by renewed and repeated steeping before the outer seedling begins to grow stronger. The oxygen supply then accumulated in the grain favors the growth of the inner seedling. Any malodorous gases present in the grain as a result of chemical decomposition are removed by the aeration.

Since the inner seedling will grow for some time if the grain is supplied with no more outside water and since the outer seedling does not grow if no oxygen is supplied to it, the water used in some of the later steeping phases can also be replaced by an oxygen-poor gas or gas mixture, preferably carbon dioxide, provided only that sufficient quantities of water are taken up during the previous steeping phases. The use of carbon dioxide is particularly suitable whenever a rise in the water content of the germinating material is not necessary. Also, if, instead of water, an oxygen-poor gas or gas mixture or carbon dioxide is used, a malting material can be obtained in which the grain has a far better growth of the inner seedling, a higher water content and which is free from undesired smells.

The process of the invention can be effected with steady, rising or falling temperatures.

In a novel manner, the malting tower according to the invention enables the malting material to be steeped and aerated in each of the treatment chambers of the tower since the troughs which carry the malting material are, when in their horizontal or working position, so designed as to seal off the individual treatment chambers relative to one another. Thus it is possible, for instance, to steep malting material in one chamber while an aeration process is being carried out in the treatment chamber located directly thereabove or below.

It is possible according to this invention to provide special controllable means for conveying air to the various treatment spaces, such means also being suitable for conveying gas and air with carbon dioxide or other gases so that air or gas or a mixture thereof may be conveyed to each chamber at a temperature and of a moisture content and composition which may be regulated independently of the temperature, moisture content and composition of the mixture of air and gas conveyed to the other treatment chambers, part of the air or gas thus conveyed preferably being taken from other treatment chambers, while each of the treatment chambers is provided with its own take-offs for the processing media. Thus the malting material contained in each treatment chamber may be treated in the manner best desirable for the malting process.

The instant invention will now be described in detail with reference to the illustrative accompanying drawings wherein:

FIG. 1 is a diagrammatic longitudinal cross-sectional view of a preferred embodiment of a vertical malting tower according to the instant invention concepts;

FIG. 2 is an enlarged fragmentary cross-sectional view through a portion of a malting tower according to this invention;

FIGS. 3 and 4 are transverse cross-sectional views taken respectively along lines III—III and IV—IV of FIG. 2;

Figure 5:
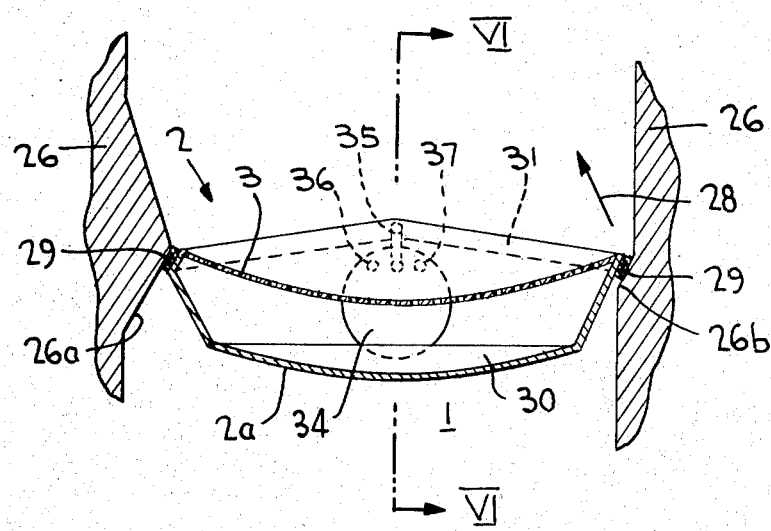
FIG. 5 is a view similar to FIG. 3 through a portion of a slightly modified trough according to the instant inventive concepts.

Like reference characters refer to like parts throughout the several views of the drawings. The malting tower shown in FIG. 1 serves for malting a malting material 19 and is provided with eleven treatment spaces designated A to L, lying one below the other, which serve for the various steeping, aeration and germination stages of the process. Under these treatment spaces is provided a further space designated M for withering and drying the malting material 19. All of the treatment spaces A–L are similarly formed and accommodated in the tower, the walls of which are designated by the reference numerals 1, 1a and 26, 26c. Each treatment space is defined by an upper and a lower trough 2, which can be sealed on all sides against the walls 1, 1a and 26, 26c of the tower, but which can be tilted about its long axis 3a, which, as shown, is a horizontal axis and perpendicular to the plane of FIGS. 3 and 4. A water permeable, perforated strainer 3 is arranged above the bottom 2a of each trough 2 and rigidly connected to its respective trough.

Since the trough is sealed on all sides with respect to the tower walls, water can be supplied in each treatment space to the height of the water level 4. The space between the bottom 2a of trough 2 and the bottom of perforated strainer 3 attached thereto is joined to a rising pipe connection 5 which is joined to an exhaust pipe 6. From the space under the bottom 2a circulating air can be evacuated in the direction of arrows 42, 43, 44. Air or an air-gas mixture is supplied to each treatment space A–L in the direction of arrow 45 through supply pipe 7, in each of which is fitted an individually controllable fan 8. The three upper fans 8 draw fresh air in the direction of arrow 46 from the space 9, through heat regulators 10, which can be used either for heating or for cooling. The space 9 is connected by an aperture 9b to the outside atmosphere. Exhaust pipe 6 leads, via rising pipe connection 5, into the space between the perforated strainer 3 and the bottom 2a of the associated trough 2. Exhaust pipe 6 of the uppermost treatment space A discharges into space 11, which is connected by an aperture 11b to the outside atmosphere. The other exhaust pipes 6 discharge into a down-shaft 12 of a large cross-sectional area, which is connected below at 11a with a riser duct 13 of very large cross-sectional area. Exhaust air from uppermost treatment space A can be discharged into downshaft 12 and this discharge is controlled by means of an air-regulating flap 12a. The lower supply pipes 7, each provided with a fan 8 and heat regulator 10, branch off from riser duct 13. Gas flows from the riser duct 13 to the lower supply pipes 7 in the direction of arrows 47. In both the down-shaft 12 and the riser duct 13 are arranged water sprinklers 14, 14a which ensure that the air-gas mixtures in the shaft 12 and duct 13 are always fully saturated with water. Excess water from the down-shaft 12 and the riser duct 13 can be drawn off through a water exhaust pipe 18 having a valve 20. Down-shaft 12 is provided at the top and bottom with air-regulating flaps 15, 15a by means of which fresh air can be supplied or superfluous air-gas mixture can be extracted.

The troughs 2 are tight against the wall 1, 1a, 26, 26c of the tower (and if a plurality of troughs are provided lying alongside one another in the same horizontal plane, they should also be tight against each other). They may be individually tilted about their long axes 3a by any conventional means (not shown) so that the malting material lying on their strainers 3 falls into the treatment space lying thereunder. The circles 16 signify light-admission and control openings. The circles 17 signify door apertures, the attached doors being in two parts. To enter, both parts will be opened; for inspection or insertion of tools, only the upper part of the door need be opened, which has the advantage that the upper part may be opened even if the trough 2 is filled with water or if the perforated strainer 3 is covered with malting material.

The malting material 19 is supplied to the malting tower by means of a hopper 21 having a slider 21a, said hopper being located above the trough and strainer forming the top of treatment space A. Water is supplied into each individual treatment space A–L by a supply pipe 22 (see FIG. 2) having a valve 23, the water being withdrawn through withdrawal pipe 24 having a valve 25.

By means of the two air-regulating flaps 15 15a, the fans 8, the cooling or heating heat regulators 10 and the water supply and withdrawal pipes 22 and 24, the conditions in each individual treatment space A–L can be independently adjusted as desired. For example, the malting material 19 may be softened in the upper two treatment spaces A and B, steeped in water periodically and then again aerated with outside air. Thereafter, the grain has a water content of about 38%. The malting material is then allowed to germinate, for example in treatment spaces C, D and E. In order to obtain a higher water content, e.g. about 42–44%, with slight growth of the outer seedling and strong growth of the inner seedling, the malting material is once again steeped for a short time in treatment space F until it has absorbed a further 2–6% of water. Since the malting material remains in each treatment space for the same length of time, it is not always possible to make the changeover between steeping and germinating by moving from one treatment space to another, therefore, after the malting material has taken up the further 2–6% of water, the excess water is exhausted from the treatment space F and the malting material is aerated, thereby allowing malodorous gases to escape. The aeration may be effected not only by blowing in a gas mixture from riser duct 13, but, if desired, pure air or a mixture of air with other gases, e.g. carbon dioxide, may be blown in or, if necessary, pure carbon dioxide may be blown in. The carbon dioxide or other gases from an appropriate source 27b are supplied to the fans 8 through supply pipe 27 provided with a valve 27a.

The oxygen content of the gases supplied by the fans from riser duct 13 can be regulated, for example, by means of upper aeration flap 15. The closure of the fan allows the carbon dioxide in the treatment space connected to it to rise and the oxygen content to fall. The malting material is steeped once again in a treatment space lying below F, for example space G or H, suitably until it has taken up about 44–48% of water. Excess water is then drained off and further germination allowed to take place. In treatment space K, for example, the malting material is then steeped once again until it has taken up the greatest possible amount of water, generally about 48–54%, whereupon the superfluous water is drained and the malting material is again aerated. By means of this repeated steeping, which may take place more frequently than has been described hereinabove, it is possible to supply the malting material with, in all, over the separate steeping stages, more water than is provided in the so-called "resteeping" process and the smell and taste of the malt are consequently better than have hitherto been obtained. Moreover, the total duration of the softening and germinating processes, from entry into space A to exit from space L into the withering or kilning space M, is far shorter than has hitherto been obtainable in the prior art processes.

Referring now particularly to FIGS. 2–6, the tower walls 1, 1a and 26, 26c form, in plan view, approximately a right angle. The space enclosed by them is shut off above and below each treatment space by a tiltable trough 2 having a water-permeable, perforated strainer 3. The water-tight trough 2 carries on both sides a trunnion, which, at least one one side, is formed as a hollow trunnion 32. With these trunnions 32 or hollow trunnions the troughs 2 are mounted tiltably in the tower walls. The trough is pivoted to open in the direction of arrow 28. In order to seal off the trough with respect to tower walls 1, 1a and 26, 26c, the long sides of the trough are provided with sealing strips 29, which, in the trough's horizontal position abut on the oblique surfaces 26a and 26b of the tower walls 26, 26c. The sieve-like bottom of the strainer 3 is curved concavely, which is advantageous when emptying the malting material. It closes the trough 2 from above.

On each of the end surfaces of the trough 2, there is a shield 30, each of which carries on its upper edge a sealing strip 31, which is in contact with sealing strips 29 and which is sealably pressed against tower walls 1. The sealing strips 29 thus lie on walls 26, 26c, or on their oblique surfaces 26a and 26b when the trough is in its horizontal position, whereas the sealing strips 31 are permanently pressed against the walls 1, 1a. When the troughs are horizontal, vertical movement of material through the tower can thereby be completely eliminated.

Air, steam and air-gas mixture or the like supplied through the hollow trunnion 32 is only to be passed below the strainer 3, in the plane of the end wall 1, by means of a plate 33 which leaves an aperture 34 which opens exclusively into the space between the perforated strainer 3 and the bottom 2a of trough 2 and through which the gas is fed or extracted by means of the hollow trunnion 32. The aperture 34 has only a small height but has considerable breadth since the total height of the strainer and the trough is small.

The sealing strips 29 and 31 are preferably formed as continuous hollow hoses which can be inflated by means of water or air and the water or air for inflating these hoses is supplied from a source 35b of such pressurized fluid via a supply hose 35 with a control and shut-off valve 35a. Before the troughs 2 are tilted, the sealing strips 29 and 31 are preferably deflated. Supply hose 35 runs through hollow trunnion 32.

In order to supply air, oxygen, carbon dioxide or the like via perforated strainer 3, supply pipes 36 and 37 are provided penetrating the plate 3 of shield 30 above the bottom of strainer 3 and passing through hollow trunnion 32, these hoses being connected, through control and shut-off valves 36a, 37a to appropriate sources of pressurized fluid 38.

As shown in FIG. 2, each of the troughs 2 is positioned by means of a trunnion, whereby one trunnion 32 is hollow and the other trunnion 39 crosses through one of the two walls 1, 1a. The trunnion 39 is encircled by a washer 40 as wall 1. It carries on the end which is showing through the wall 1, a wheel 41, which can be rotated either by hand or by a chain (not shown).

The temperature employed in treatment spaces A–L may vary considerably. For example, a temperature of about 12° C. may prevail in space A and the temperature in the subsequent spaces may slowly rise to a temperature of about 18° C. in space L. However, the method may also be effected with a reverse temperature gradient, i.e. 18° C. in space A and about 12° C. in space L. Additionally, it is possible to work with the same temperature, e.g. about 15° C. in all spaces.

It is, of course, also possible to use a trough 2 with a strainer 3 as shown in the drawings in the chamber M in order to wither and roast the melting material 19. In addition, several such troughs may be arranged side by side across a given plane of the malting tower, in which case the sealing strips 29 of juxtaposed troughs will engage in the horizontal position of the troughs to seal the treatment space, with only the sealing strips 29 on the extreme troughs engaging the oblique surfaces 26a, 26b of the tower wall 26.

To facilitate an understanding of the instant inventive concepts, various techniques for using the malting tower hereof will be reviewed.

At the commencement of operation, above the treatment space A a preselected quantity of the material 19 to be processed is fed from the hopper 21 onto a tiltable trough 2. This quantity is selected in accordance with the capacity of each of the treatment spaces A to L. All the troughs 2 of the treatment spaces A to L are closed, that is, in their sealed horizontal position. The trough 2 of space A only is then partially filled with water. Operations commence with phase I in which the trough located above the treatment space A is pivoted so that the material 19 falls onto the strainer 3 of the treatment space A. Then as much water is added as is required to completely cover the surface of the malting material. After a predetermined steeping time $T_1$, the water is discharged from the treatment space A through the withdrawal pipe 25. Also, the fan 8 is used to introduce fresh air through the feed pipe 7, this air flowing through the material and then through the strainer 3, being discharged through the pipes 5 and 6 and the space 11 to the atmosphere.

At this point, phase II begins. The bottom trough of the treatment space A is tilted so that the malting material drops into treatment space B. The bottom trough of treatment space A is then restored to the horizontal sealed posiion. Thereupon, by tilting the trough 2 located above treatment space A, a new portion of material for malting is introduced into treatment space A and processed through phase I there. The malting material which has dropped onto the strainer 3 of the treatment space B, is further steeped there, the treatment space being filled with water in a similar way to the treatment space A. After the elapse of a second phase time $T_2$, the water is discharged from treatment space B and fresh-air once again introduced by the associated fan 8 and the supply pipe 7, this air, after flowing through the malting material and the strainer 3, going not to the atmosphere but into the down shaft 12.

At this point, phase III begins. The bottom trough of treatment space B is tilted so that the malting material on it falls onto the strainer 3 of treatment space C, and the trough is then restored to the horizontal sealed position. Thereupon, the bottom trough of treatment space A is tilted so that the material located there falls onto the strainer of treatment space B. Then the trough of treatment space A is tilted so that a new portion 19 of the material being malted, falls into treatment space A. Processing in the spaces A and B continues in the manner already described. No water is introduced into treatment space C and instead the malting material is allowed to germinate there for a further phase time, $T_3$. In this context, the associated fan 8 and the supply pipe 7 can be used to introduce fresh air which, depending upon the external temperature and the desired temperature of germination, is cooled or heated in the heat control unit 10. The air flows through the malting material and the strainer of the treatment space C, and carries the carbon dioxide given off by the malting material, into the down-shaft 12.

At commencement of phases IV, V and VI, the first portion of malting material passes successively through the treatment spaces D, E and F, and the ensuing portions of course keep step with it. The processes in the spaces D and E, during phases IV and V, are in each case fundamentally similar to that described in relation to space C, although the temperature may be different. The predescribed processes are repeated in spaces A, B and C. The processes in spaces D and E are similar to the process in space C, although in spaces D and E it is not fresh-air which is introduced but a gas-air mixture saturated with water and in fact possibly supersaturated, this mixture being drawn from the riser duct 13. The gas-air mixture contains an addition of carbon dioxide but less oxygen than normal air because the "exhaust air" fed into the down pipe of the spaces B, C, D and possibly from the spaces below them, contains a lower than normal oxygen content but additional carbon dioxide. The malting material which has reached space F, is there once again fully covered with water, which is introduced through supply pipes 22 until all the material in the space is covered by the water. The process now continues in accordance with the process taking place in space B, with the sole distinction that after discharging the water it is not fresh air, but a gas-air mixture from the riser duct 13, which is blown from top to bottom through the malting material and the strainer. The gas-air mixture may if required have carbon dioxide mixed with it. Also, it is a matter for arbitrary choice to use instead of a mixture, pure carbon dioxide. Again, the temperature may be selected differently by means of the separate temperature control unit 10.

During phase VII the first portion of the malting material enters the space G where processing takes place similar to that taking place in E, possibly however at different temperatures and using smaller or larger quantities of carbon dioxide and fresh air in the gas-air mixture which is introduced into the space by the associated fan. The processes in the spaces A to F are repeated as aforedescribed.

During phase VIII, the first portion of the malting material enters space H. There, it is treated in a similar manner to that described previously in relation to space F, i.e. it is watered for a time, then, after the discharge of the water, subjected to downdraught. Finally, in phase IX it is introduced into space J where it is treated in a similar manner already described in relation to spaces D and E. During phases X and XI, the first portion successively enters spaces K and L and during phase XII is ejected from space L and at that time, either through the medium of some arbitrary conveyor device or by simple gravity feed arrangement, it passes into drying and kilning spaces located further down such as space M, which, like the spaces A to L, may be equipped with corresponding troughs and gratings.

In an alternate method for using the tower, the treatment in the spaces A to L is substantially the same as the treatment described for these stages in the above method. The steeping in the water bath in space H, however, is eliminated, and the liquid necessary for germination is introduced possibly by opening the sprinklers 14, 14a wider and possibly by the additional introduction of water into the malting material through the water feed pipes 22.

The above method may be further modified by eliminating the steeping in the water bath in space F.

The second method may also be utilized with steeping carried out neither in space F nor in space H although it is carried out once in space G.

Finally, the third-described method may be utilized with extended phase times. This means that the steeping in the water bath is completed before the end of the first phase so that likewise before the end of the first phase the water can be discharged from space B and fresh air blown through it, germination starting in the space B. Then, germination is completed before the material reaches spaces L or K so that the bottom troughs of these spaces remain open during operation.

The following applies in relation to all the aforementioned methods.

During phases I to XI, the quantity of carbon dioxide remaining in the malting material can be regulated by more or less radical throttling of the fans. With heavy throttling, little fresh air or gas-air mixture will be introduced into the associated treatment space so that the carbon dioxide developing in the malting material, is driven off only slowly. Without any throttling, the material is aerated quickly so that in each case relatively little carbon dioxide is left there. The water content of the gas-air mixture is regulated by the nozzles 14, 14a and the oxygen content of the gas-air mixture in the riser duct is modified by the air feed discharge flaps 15, 15a and possibly by the introduction of pure oxygen.

From the foregoing it will be seen that there is herein provided an improved method and means for malting material which satisfies all of the above objectives and others.

Figure 6:
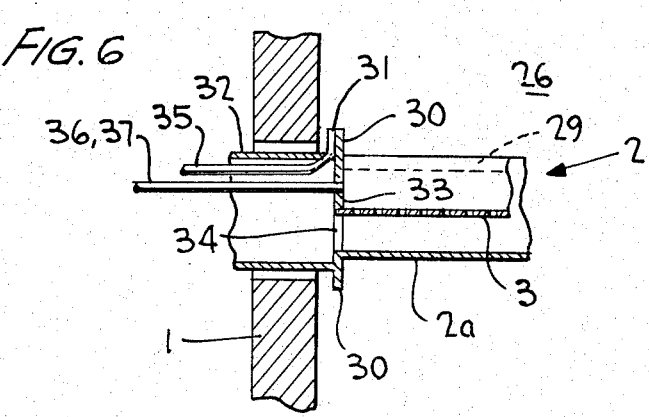
FIG. 6 is a cross-sectional view taken along lines VI—VI of FIG. 5.

In the contrary to the trough shown in FIGS. 2–5, the supply hoses 35 for the sealing strips 29, 31 of the slightly modified trough of FIGS. 5 and 6 are provided on the outside of the shield 30 of the trough. Further there are supply pipes 36, 37 passing through the hollow trunnion 32 and the plate 33 of the shield 30. Said supply pipes 36, 37 are provided for supplying air, oxygen, carbon dioxide or the like from bottom through the trough 2 and the malting material 19. Such additional supply means are shown in FIG. 2 already.

I claim:

1. A vertical malting tower comprising: a tower containing a plurality of vertically spaced, normally horizontal troughs defining treatment spaces therebetween each of said troughs including an upper perforated strainer adapted to support a quantity of grain and an imperforate bottom spaced below said strainer, each of said troughs being tiltable about a horizontal axis, means for sealing said troughs to the walls of said tower whereby said treatment spaces are sealed from one another when said troughs are horizontal and said grain may fall from each trough to a trough below when said troughs are pivoted; and means for feeding grain to the uppermost trough and for removing grain from the bottom trough; wherein each treatment space is equipped with means for charging and discharging water into and from said treatment spaces and wherein each treatment space is equipped wtih separately controllable feeding means for gaseous material, said feeding means supplying to each treatment space a gaseous material, the temperature, humidity and composition of which are adjustable independently of the temperature, humidity and composition of a gaseous material fed to the other treatment spaces, each treatment space further including a separate gaseous material discharge means; further including a vertically disposed down-shaft of large cross-sectional area, said gaseous material discharge means from at least some of said treatment spaces communicating with said down-shaft, a riser duct communicating with the bottom of said down-shaft, and the gaseous material feeding means for at least some of said treatment spaces communicating with said riser duct at approximately the level of the respective treatment space; and wherein the space beneath said strainer in each treatment space communicates with an exhaust pipe through a rising pipe connection, the top end of which rising pipe connection is located above the level at which water would be introduced into said treatment space for steeping said grain; and wherein further said sealing means includes at least one fluidtight and flexible hose which is secured to periphery of said trough, said hose bearing against walls of said tower when said trough is horizontal and said hose being connected with a source of pressurised fluid for expanding said sealing means in operation.

2. A malting tower as claimed in claim 1 including fan means provided in said gaseous material feeding means of each treatment space.

3. A malting tower as claimed in claim 1 wherein said gaseous material feeding means communicates with each treatment space above the strainer therein.

4. A malting tower as claimed in claim 1 wherein said troughs are each tiltably mounted at at least one end on a hollow trunnion of large diameter, said means for charging and discharging water and gaseous material communicating with said treatment spaces through said trunnions.

5. A malting tower as claimed in claim 4 wherein each trough includes an endplate projecting beyond said strainer, said endplates carrying said trunnion, said trunnion projecting beyond said strainer and being closed off in the zone above said strainer by said endplate.

References Cited
UNITED STATES PATENTS

| | | | |
|---|---|---|---|
| 672,843 | 4/1901 | Renner | 195—130 |
| 1,961,990 | 6/1934 | Sleeman | 195—130 |

A. LOUIS MONACELL, Primary Examiner

W. A. SIMONS, Assistant Examiner

U.S. Cl. X.R.

99—53; 195—70, 128, 130